United States Patent
Suzuki et al.

(10) Patent No.: US 6,756,981 B2
(45) Date of Patent: Jun. 29, 2004

(54) GRAPHICS PROCESSOR AND SYSTEM FOR DETERMINING COLORS OF THE VERTICES OF A FIGURE

(75) Inventors: Katsunori Suzuki, Hitachi (JP); Ryo Fujita, Hitachi (JP); Kazuyoshi Koga, Hitachinaka (JP); Yuichi Abe, Hitachi (JP); Mitsuru Soga, Kitakanbara-gun (JP); Kazuhisa Takami, Hitachi (JP); Koyo Katsura, Hitachiohta (JP); Hideki Fujii, Hitachinaka (JP); Kazunori Oniki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/223,600

(22) Filed: Aug. 20, 2002

(65) Prior Publication Data

US 2002/0196254 A1 Dec. 26, 2002

Related U.S. Application Data

(63) Continuation of application No. 09/659,577, filed on Sep. 11, 2000, which is a continuation of application No. 08/769,356, filed on Dec. 19, 1996, now Pat. No. 6,118,453.

(30) Foreign Application Priority Data

Jan. 16, 1996 (JP) ............................................. 8-004517

(51) Int. Cl.[7] ............................................. G06T 15/00
(52) U.S. Cl. ....................................... 345/426; 345/589
(58) Field of Search .................................. 345/426, 581, 345/589, 591, 592, 593, 600, 601, 602, 545, 549, 550, 556

(56) References Cited

U.S. PATENT DOCUMENTS 5,777,620 A * 7/1998 Billyard ...................... 345/426

FOREIGN PATENT DOCUMENTS

| JP | 63-029891 | 2/1988 |
| JP | 06-203175 | 7/1994 |

OTHER PUBLICATIONS

Newman et al.: Principles of Interactive Computer Graphics, pp. 19, 389–410, 1979.

* cited by examiner

*Primary Examiner*—Almis R. Jankus
(74) *Attorney, Agent, or Firm*—Kenyon & Kenyon

(57) ABSTRACT

A graphics processor comprises: a light source table holding light source data; a conversion unit for converting the light source data to be set in the light source table from a float type (single-precision floating point real number type) into an int type (integer type); an inner product calculation unit for calculating the inner products of normal directions, light source directions and sight line directions at the vertices based on the light source data; and a color calculation unit for performing light source computations based on the calculated inner products to determine the colors of the vertices.

3 Claims, 11 Drawing Sheets

FIG. 7

| 127 112 | 111 96 | 95 80 | 79 64 | 63 48 | 47 32 | 31 16 | 15 0 | |
|---|---|---|---|---|---|---|---|---|
| | Ka.b | Ka.g | Ka.r | a | Nz | Ny | Nx | |
| | K.b | K.g | K.r | SM | Kd.b | Kd.g | Kd.r | 0 |
| | | | | | Ks.b | Ks.g | Ks.r | Lflagc |
| | AtSp.1 | Hz.1 | Hy.1 | Hx.1 | Lz.1 | Ly.1 | Lx.1 | |
| Lcs.g.1 | Lcs.r.1 | Lcd.b.1 | Lcd.g.1 | Lcd.r.1 | Lca.b.1 | Lca.g.1 | Lca.r.1 | Lflag.1 |
| | | | | | | | Lcs.b.1 | |
| ⋮ | | | | | | | | |
| | AtSp.8 | Hz.8 | Hy.8 | Hx.8 | Lz.8 | Ly.8 | Lx.8 | |
| Lcs.g.8 | Lcs.r.8 | Lcd.b.8 | Lcd.g.8 | Lcd.r.8 | Lca.b.8 | Lca.g.8 | Lca.r.8 | Lflag.8 |
| | | | | | | | Lcs.b.8 | LIGHT SOURCE TABLE 3 |

| 127 | 112 111 | 96 95 | 80 79 | 64 63 | 48 47 | 32 31 | 16 15 | 0 |
|---|---|---|---|---|---|---|---|---|
| | Ka.b | Ka.g | Ka.r | a | Nz | Ny | Nx | |
| | Ke.b | Ke.g | Ke.r | SM | Kd.b | Kd.g | Kd.r | |
| | | | | | Ks.b | Ks.g | Ks.r | |
| | | | | | Lcta.b | Lcta.g | Lcta.r | |

Lflagc  0

| At.1 | Hz.1 | Hy.1 | Hx.1 | Lz.1 | Ly.1 | Lx.1 | |
| Lcs.g.1 | Lcd.b.1 | Lcd.g.1 | SE.1 | -SDz.1 | -SDy.1 | -SDx.1 | |
| | | | Lcd.r.1 | Lca.b.1 | Lca.g.1 | Lca.r.1 | |
| | | | | | | Lcs.b.1 | |

Lflag.1

............

| At.8 | Hz.8 | Hy.8 | Hx.8 | Lz.8 | Ly.8 | Lx.8 | |
| Lcs.g.8 | Lcd.b.8 | Lcd.g.8 | SE.8 | -SDz.8 | -SDy.8 | -SDx.8 | |
| | | | Lcd.r.8 | Lca.b.8 | Lca.g.8 | Lca.r.8 | |
| | | | | | | Lcs.b.8 | |

Lflag.8

LIGHT SOURCE TABLE 2 ~200

FIG. 9

| 127 | 112 111 | 96 95 | 80 79 | 64 63 | 48 47 | 32 31 | 16 15 | 0 | |
|---|---|---|---|---|---|---|---|---|---|
| | AtSp.1 | Hz.1 | SM | a | Kz | Ky | Kx | | Lflag.0 |
| Cs.g.1 | Cs.r.1 | Cd.b.1 | Hy.1 | Hx.1 | Lz.1 | Ly.1 | Lx.1 | | Lflag.1 |
| | | Cd.g.1 | | Cd.r.1 | Ca.b.1 | Ca.g.1 | Ca.r.1 | K.b K.g K.r | |
| | | | | | | | Cs.b.1 | | |
| | AtSp.8 | Hz.8 | | | | | | | Lflag.8 |
| Cs.g.8 | Cs.r.8 | Cd.b.8 | Hy.8 | Hx.8 | Lz.8 | Ly.8 | Lx.8 | | |
| | | Cd.g.8 | | Cd.r.8 | Ca.b.8 | Ca.g.8 | Ca.r.8 | | |
| | | | | | | | Cs.b.8 | | |

LIGHT SOURCE TABLE 1 ~100

FIG. 10

| | 127 | 96 95 | 64 63 | 32 31 | 0 | ST1 |
|---|---|---|---|---|---|---|
| | | ... | COMMON DATA | LCOM(LtblW) | | |

| | | | | ST2 |
|---|---|---|---|---|
| | | | RPCOM(Strip) | LCOM(CBufW) |
| y | x | | LCOM(LtblW) | z |
| Ny | Nx | | LCOM(Lcaic) | Nz |

| | | | ST3 |
|---|---|---|---|
| | ... | LIGHT SOURCE DATA 9 | LCOM(LtblW) |

| | | | ST4 |
|---|---|---|---|
| | s | | LCOM(CBufW) | LCOM(LcaicC) |
| t | | | LCOM(Exec) | rate | w |

| | | | | ST5 |
|---|---|---|---|---|
| | (int)z | (int)y | (int)x | RPCOM(strip) |
| l.g | l.r | (int)w | (int)t | (int)s | l.a | l.b |
| (int)rate | | | | |

INPUT OF GPIF

OUTPUT OF GPIF

FIG. 11

DATA SET IN LBuf BY GP

| 127 | 96 | 95 | 64 | 63 | 32 | 31 | 0 |
|---|---|---|---|---|---|---|---|
| d3 || d2 || d1 || LCOM ||
|  ||  || d6 || d5 || d4 ||

FI CONVERSION(d8~d1) = "??111000"

pack(d8~d1) = "??001110"

DATA TO BE SET IN THE LOCATION WHERE DATA ARE SET

LOWER 2 BYTES OF d2, d3, (int)d4

| (int)d5 | — | d3 | d2 | d1 |
|---|---|---|---|---|
|  |  |  |  | (int)d6 |

(int)d4

GRAPHICS PROCESSOR AND SYSTEM FOR DETERMINING COLORS OF THE VERTICES OF A FIGURE

This is a continuation of application Ser. No. 09/659,577 filed Sep. 11, 2000, which is a continuation of application Ser. No. 08/769,356 filed Dec. 19, 1996, now U.S. Pat. No. 6,118,453.

FIELD OF THE INVENTION

The present invention relates to a technique to increase the speed of a light source calculation (brightness calculation, illumination processing) to determine the colors of vertices of a figure from information, such as vertices of a figure, light sources, the position of a viewing point, colors and normal vectors, to see how the figure looks when illuminated by a plurality of light sources during the shading processing (shading, half-tone processing) in a computer graphics system.

Specifically, this invention relates to a graphics processor to determine colors by performing the light source calculation mentioned above and to a graphics system using the graphics processor.

BACKGROUND OF THE INVENTION

The computer graphics system displays the output of a computer in the form of figures.

The light source calculation in the shading processing in a conventional computer graphics system is detailed in pOpenGL Programmnig Guide (Japanese version), published by Seiunsha, 1993, pp. 157–194.

The computer graphics system performs geometric processing and rendering processing. The geometric processing includes coordinate conversion of vertices of a figure and light source calculation to calculate colors of the vertices from information about, e.g., vertices of a figure, a light source, a viewing point position, colors and normal vectors, to see how the figure looks. The rendering processing involves developing and drawing pixels inside the figure one by one based on information about vertex coordinates and colors and so on. After the geometric processing and the rendering processing, the computer graphics system writes the contents to be displayed on the screen into a frame memory that stores data in a bit map format.

The computer graphics system generally represents pixel data by color data rgba (red, green, blue, alpha) of a figure, and performs the geometric processing in the float type and the rendering processing in the short-int type.

Here, the float type represents 32-bit floating point real numbers, the int type represents 32-bit integers (including fixed point real numbers), and the short int type represents 8- to 16-bit integers.

For the sake of simplicity, we assume that the short int type is 16-bit integers.

Now, let us explain about the computer graphics system whose color data of the pixel data in the frame memory are 8 bits (=1 byte) for each color component, or 32 bits in total.

The conventional light source computation calculates light source formulas such as Equation 4 in a float type which has large hardware quantities and is slow.

(Each component of rgb is calculated independently by Equation 4, and no calculation is performed on the component a. I.a=a)

[Equation 4]

$$I = Ke + Ka \, \flat \, Lcta + \left[ \sum_{i=1}^{n} [Ka \times Lca.i + Kd \times Lcd.i \times (N \cdot L.i) + Ks \times Lcs.i \times (N \cdot H.i)^{\wedge} SM ] \times At.i \times Sp.i \right] \quad \text{Equation (4)}$$

where m is the number of light sources;

i (i=1 to m) is a light source;

I=(I.r, I.g, I.b, I.a) is a color calculated by the light source computation;

Ka=(Ka.r, Ka.g, Ka.b) is a ambient reflection coefficient of a material;

Kd=(Kd.r, Kd.g, Kd.b) is a diffuse reflection coefficient of a material;

Ks=(Ks.r, Ks.g, Ks.b) is a mirror surface reflection coefficient of a material;

Ke=(Ke.r, Ke.g, Ke.b) is a radial reflection coefficient of a material;

SM (0.0≦SM≦128.0) is a mirror surface index of a material;

Lcta=(Lcta.r, Lcta.g, Lcta.b) is a color for each reflected light of an overall background light source;

Lca.i=(Lca.r.i, Lca.g.i, Lca.b.i) is a color for background reflection light from a light source;

Lcd.i=(Lcd.r.i, Lcd.g.i, Lcd.b.i) is a color for diffuse reflection light from a light source;

Lcs.i=(Lcs.r.i, Lcs.g.i, Lcs.b.i) is a color for mirror surface reflection light from a light source;

Normal vector N=(Nx, Ny, Nz);

Light source direction vector L.i=(Lx.i, Ly.i, Lz.i);

Halfway vector (maximum highlight direction vector) H.i=(Hx.i, Hy.i, Hz.i),
H.i=(V+L.i)/p̀V+L.ip̀ where p̀V+L.ip̀ is a magnitude of (V+L.i) sight direction vector V=(Vx, Vy, Vz) Each vector having a magnitude of 1.

It is assumed that (N·L.i)=0 when (N·L.i)≧0: (N·L.i)<0.
It is also assumed that (N·H.i)=0 when (N·H.i)≧0.
Further, it is assumed that (N·H.i)=0 also when (N·L.i)≦0.
Here, the attenuation coefficient At.i and the spot light source effect Sp.i are defined as follows:

At.i=1 for parallel light sources
=1/(Kc+Klpd+Kqpd^2): for point light sources and spot light sources
where Kc, Kl, Kq are attenuation constants and d is the distance from the light source to the vertex.

Sp.i=1: for parallel light sources and point light sources
=(−SD.i·L.i)^SE.i: within the illumination range of a spot light source (−SD.i·L.i)≧cos(SC.i)
=0: outside the illumination range of a spot light source (−SD.i·L.i)<cos(SC.i)
where SD.i=(SDx.i, SDy.k, SDz.i) is the spot light source direction vector;
SE.i is the spot light index; and
SC.i is the cutoff index of a spot light source.
FIG. 6 shows the relation among the above vectors.
The conventional light source computation calculates these complex light source formulas in a float type that has large hardware quantities and is slow. Therefore, the light source computation requires a large quantity of float type calculations, and hence the conventional computer graphics systems use a geometry processor GP dedicated to the geometric processing to perform the light source computation by software. This requires a huge amount of time for the light source computation.

The conventional computer graphics systems have a problem that although each component of the color data rgba in the frame memory are 8-bit data, the conventional light source computation requires performing a great amount of slow float type calculation (32 bits) containing many hardware quantities and spends a vast amount of time.

SUMMARY OF THE INVENTION

An object of the present invention is to provide a graphics processor and a graphics system, which can perform light source computations in shading processing at significantly high speeds.

The graphics processor of this invention comprises: a light source table holding light source data; a conversion unit for converting the light source data to be set in the light source table from a float type (single-precision floating point real number type) into an int type (integer type); an inner product calculation unit for calculating the inner product of the normal directions, light source directions and sight line directions at vertices of at least a three-dimensional figure according to the light source data; and a color calculation unit for performing light source computations based on the calculated inner products to determine colors of vertices.

With the above configuration, the light source computation of int type can be executed, increasing the speed of the light source computations in shading processing and therefore the speed of the figure drawing processing.

Further, the graphics system o this invention comprises: a graphics processor for determining colors of vertices of at least a three-dimensional figure by calculating the inner products of normal directions, light source directions and sight line directions at each of the vertices; a frame memory; a rendering processor for interpolating pixels inside the figure based on the calculated colors of the vertices and writing the pixel into the frame memory; and a display device; wherein the graphics processor includes: a light source table holding light source data; a conversion unit for converting the light source data to be set in the light source table from a float type (single-precision floating point real number type) into an int type (integer type); an inner product calculation unit for calculating the inner products of normal directions, light source directions and sight line directions at the vertices according to the light source data; and a color calculation unit for performing light source computations based on the calculated inner products to determine colors of vertices.

With the above configuration, it is possible to increase the speed of the light source computations in shading processing and also the speed of the figure drawing processing.

Further, in the graphics processor of this invention each of the m light source data held in the light source table has a light source computation in-process flag which represents whether the light source computation on the light source data is being performed, and a light source table control unit is provided, which, at the start of the light source computation, locks the flags for all light source data and, each time the light source computation is finished for one light source data, unlocks the corresponding flag. With this configuration, each time the light source computation is finished for one light source, new light source data can be set immediately in areas in the light source table for which the corresponding flags are unlocked (data areas for which the light source computation has ended). This allows quick setting of data even when the light source data areas in the light source table that are available for setting are few.

BRIEF DESCRIPTION OF THE DRAWINGS

FIG. 7 is an example of the light source table of this invention;

FIG. 8 is another example of the light source table of this invention;

FIG. 9 is still another example of the light source table of this invention;

FIG. 10 is a table showing an example of use of commands by the processor of this invention; and FIG. 11 is a table showing an example of FI conversion and pack operation performed by the processor of this invention.

DESCRIPTION OF THE PREFERRED EMBODIMENTS

The present invention will now be described in detail in connection with the preferred embodiments, referring to the accompanying drawings.

(Embodiment 1)

Figure 1:
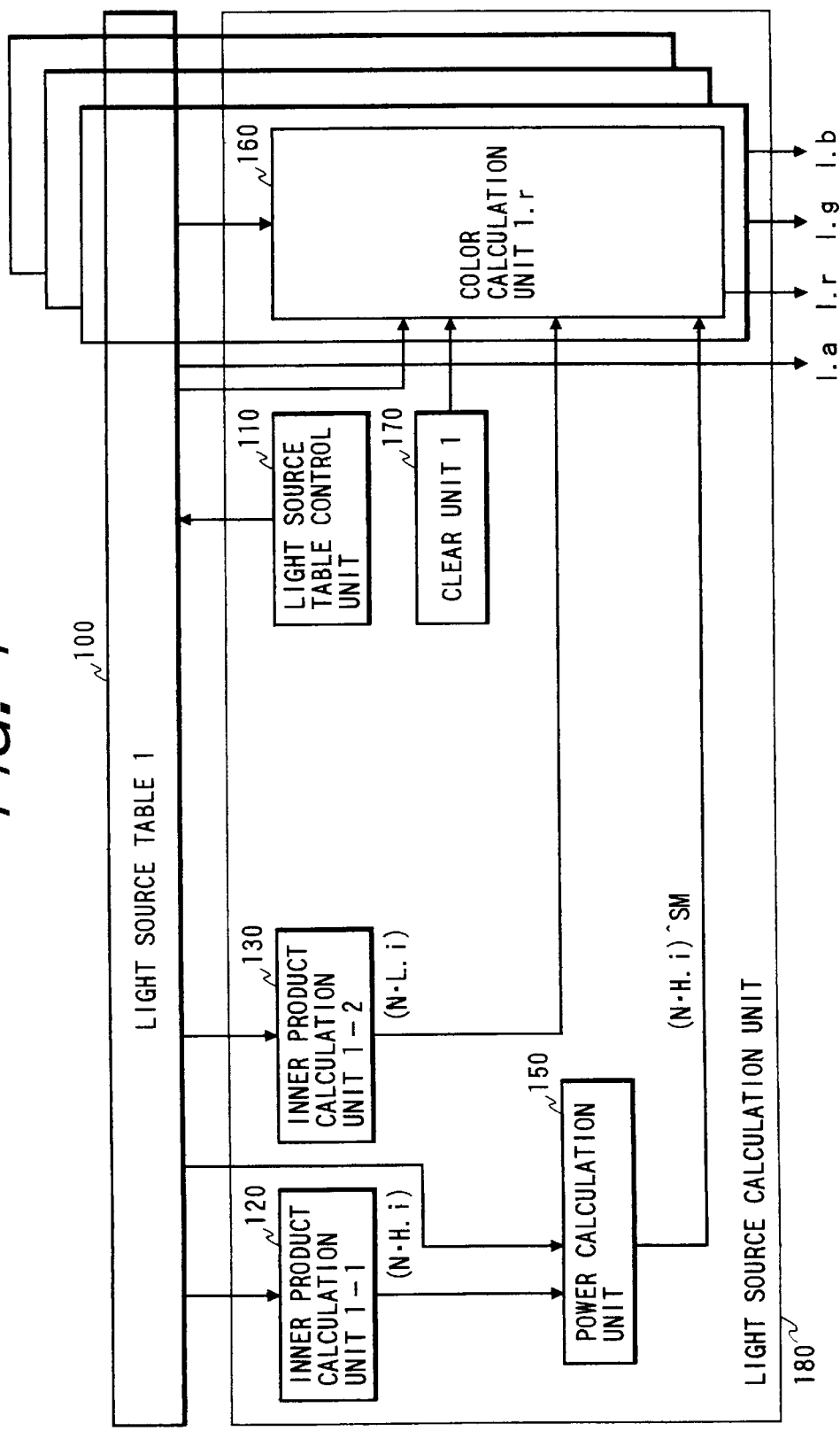
FIG. 1 is a schematic diagram showing one embodiment of the light source computation unit of this invention.

FIG. 1 is a schematic diagram showing the configuration of a light source computation unit of one embodiment of this invention.

The light source computation unit (180) incorporated in the graphic processor of this invention includes a light source table control unit (110) that locks and unlocks a light source table 1 (100), a register that holds light source data required for the light source computation; a first inner product calculation unit 1—1 (120) and a second inner product calculation unit 1-2 (130), both to calculate the inner product of vectors; a power calculation unit (150) to calculate powers; color calculation units (160) (three units for r, g and b) to calculate colors of vertices by performing the light source computation for m light sources, using the results of above calculations and the light source data of the light source table 1 (100); and a clear unit (170) to automatically clear the present colors of intermediate results of calculation after outputting them.

To simplify explanation, let us take an example where the light source table 1 (100) can hold eight sets of data for the light source 1 to 8, which is of the short int type.

First, the light source table 1 (100) is a register that holds the following values required for the light source computation and the detailed configuration diagram is shown in FIG. 9. These values are set in the light source table 1 (100) by the geometry processor GP that performs coordinate conversion. The values set in the light source table 1 (100) are already converted from the float type to the short int type.

The light source table 1 (100) holds one set of common data that are common for all light sources, such as normal vectors and reflection coefficients of materials, and eight sets of light source data i that are unique for each light source i (i=1 to 8), such as light source direction vectors and colors of reflected light of light source. For the common data and each light source data i, there is a light source computation in-process flag that indicates whether or not the light source computation unit (180) is using these data in the light source computation. The light source table control unit (110) sets the flag to the lock or unlock state. When the light source computation in-process flag is in the lock state, the data cannot be changed; when in the unlock state, the data can be changed.

The common data includes the following:

normal vectors N=(Nx, Ny, Nz), transparency a, the sum of the color of a radial reflection light component and the color of an overall background reflection light component K=(K.r, K.g, K.b), mirror surface index of a material SM, and light source computation in-process flag for the common data Lflagc.

The light source data i (i=1 to 8) includes the following:

light source direction vector L.i=(Lx.i, Ly.i, Lz.i), halfway vector H.i=(Hx.i, Hy.i, Hz.i), (each vector is assumed to be normalized.)

the product of an attenuation coefficient At.i and a spot light source effect Sp.i, AtSp.i, the product of the background reflection coefficient of a material and the color of background reflection light from a light source Ca.i=(Ca.r.i, Ca.g.i, Ca.b.i), the product of the diffused reflection coefficient of the material and the color of diffuse reflection light from a light source Cd.i=(Cd.r.i, Cd.g.i, Cd.b.i), the product of the mirror surface reflection coefficient of the material and the color of mirror surface reflection light from a light source cs.i=(Cs.r.i, Cs.g.i, Cs.b.i), and light source computation in-process flag for the light source data i, Lflag.i.

Next, the light source computation unit (180) will be explained.

The detail of the light source computation unit (180) is shown in FIG. 1.

The light source computation unit (180) comprises a light source table control unit (110) that controls data swapping in the light source table 1 (100); an inner product calculation unit 1—1 (120) to calculate the inner product (N·H.i) between the normal vector N and the halfway vector H.i and an inner product calculation unit 1-2 (130) to calculate the inner product (N·L.i) between the normal vector N and the light source direction vector L.i; a power calculation unit (150) to calculate the SM power of inner product (N·H.i); a color calculation unit (160) to determine colors from the light source computation using the above results; and a clear unit (170) to automatically clear the colors of intermediate results of calculation after outputting them.

The light source computation unit (180) is started by a light source computation command and a light source computation & color command from the geometry processor GP to perform the light source computation for each of the light sources 1 to Lnum successively. The command number of light-sources Lnum (1≦Lnum≦8) is encoded in the command. The light source computation unit (180) clamps the intermediate calculated value of color (for example, inner product) and the calculated color in [0.0–1.0], [0–255] as required.

Next, the individual constitutional elements of the light source computation unit will be explained.

To prevent data of the light source table 1 (100) from being modified during the light source computation, the light source table control unit (110) locks the light source computation in-process flag Lflagc, Lflag.i at the start of the light source computation. Then, the light source computation unit (180) reads the light source data i (i=1 to Lnum) of the light source table 1 (100) one data at a time to perform the light source computation on the light source i successively. Each time the light source computation for one light source is completed, the light source table control unit (110) unlocks the light source computation in-process flag Lflag.i for the light source data i for which the computation has finished. When all the light source computations are finished, the light source table control unit (110) unlocks the light source computation in-process flag for the common data Lflagc. Thus, even during the light source computation, each time the light source computation for one light source is finished, the next, up to eight, light source data can immediately be set one by one in the areas of the light source table 1 (100) where the light source computation has ended. This makes it possible to cope with a large number of light sources even when the number of light source data areas in the light source table that are available for setting is small, allowing the light source data to be set in the light source table 1 (100) at significantly high speeds.

Next, the clear unit (170) clears the colors, which are the intermediate results of light source computations for a plurality of light sources and are held in the color calculation unit (160), after outputting them. Because the light source table 1 (100) can hold only eight sets of light source data at the maximum, when the number of light sources m is greater than 8, as when m=9, the color calculation unit (160) first sets the data for the light source 1 to 8 in the light source data area 1 to 8 in the light source table 1 (100), and holds as the colors of intermediate calculation results those colors that have been calculated by the light source computations performed on the light source 1 to 8 according to the light source computation command requesting only the light source computation and to the command light source number Lnum=8. Next, the color calculation unit (160) sets the data of a light source 9 in the area of the light source data 1 in the light source table 1 (100) (the data of the light source 1 is destroyed) and performs the light source computation on the light source 9 according to the light source computation & color command requesting the light source computation and the output of the calculated color and to the command light source number Lnum=1, to add the color of the light source 9 to the colors of intermediate calculation results for the light source 1 to 8 and determine the colors of the light source 1 to 9 (the colors of the present intermediate calculation results). After outputting the colors of the intermediate calculation results, the color calculation unit (160) clears these colors. This enables a large number of light sources to be processed even when there are few light source data areas in the light source table that are available for setting. This also obviates the need for a clear command used to clear the colors of intermediate calculation results, making it possible to control the light source computation unit at significantly high speeds.

Next, let us explain about the inner product calculation unit 1—1 (120), the inner product calculation unit 1-2 (130), the power calculation unit (150) and the color calculation unit (160).

For the sake of simplicity, we will explain about the case where the number of light sources is m=1 to 8.

First, the colors of intermediate calculation results are automatically cleared by the clear unit (170) at the end of the previous light source computation & color command.

Next, the light source computation is performed for each light source i=1 to m.

The inner product calculation unit 1—1 (120) calculates the inner product (N.i) of the normal vector N and the halfway vector H.i, and the inner product calculation unit 1-2 (130) calculates the inner product (N·L.i) of the normal vector N and the light source direction vector L.i.

Then, the power calculation unit (150) calculates (N·H.i)^SM from, for example, $$(N \cdot H.i)^{\wedge}SM = e^{\wedge}(SM \times LOG(N \cdot H.i))$$

where LOG is a logarithmic operation.

Using the above result, the color calculation unit (160) calculates each component of rgb from Equation 5. (The component a is not calculated. I.a=a)

[Equation 5]

$$I = K + \left[ \sum_{i=1}^{n} (Ca.i + Cd.i \times (N \cdot L.i) + Cs.i \times (N \cdot H.i)^{\wedge}SM) \times AtSp.i \right] \quad \text{(Equation 5)}$$

where (N·H.i)^SM is SM power of (N.H.i)

m is the number of light sources, i is a light source (i=1 to m), and

I=(I.r, I.g, I.b, I.a) is the color calculated by the light source computation.

The above equation is calculated in the short int type representation by performing the light source computations on the light source 1 to m to determine the color of vertices I.

As described above, because the light source computation unit of this invention can perform most of the light source computation, which has so far been processed by software in the float type calculation that has many hardware quantities and is slow, by hardware in the short int type calculation that has few hardware quantities and is fast, the light source computation can be done with far fewer hardware quantities than when the float type calculation is used to implement hardware and at significantly higher speeds than the geometry processor GP can perform the light source computation by software.

Further, the light source computation unit of this invention can deal with a large number of light sources even when the light source table has only a small number of light source data areas available for setting, by swapping the light source data by the light source table control unit. Because, even during the light source computation, each time the light source computation for one light source is completed, the next light source data can immediately be set one by one in areas of the light source table where the light source computation has ended, it is possible to set the light source data in the light source table at remarkably high speeds.

Further, because the light source computation unit of this invention is cleared by the clear unit automatically after outputting the temporarily held colors of intermediate result of light source computation, it is possible to cope with a large number of light sources by swapping the light source data even when the light source data areas settable in the light source table that are few. This makes unnecessary the clear command for clearing the colors of intermediate results after their output, allowing the light source computation unit to be controlled at significantly high speeds.

As described above, the light source computation unit of this invention can increase significantly the speed of the light source computation in the shading processing of the graphics system.

Next, another example of the light source data held in the light source table of FIG. 9 is shown in FIG. 7.

The common data includes:

normal vector N=(Nx, Ny, Nz), transparency a, background reflection coefficient of a material Ka=(Ka.r, Ka.g, Ka.b), diffuse reflection coefficient of a material Kd=(Kd.r, Kd.g, Kd.b), mirror surface reflection coefficient of a material Ks= (Ks.r, Ks.g, KS.b), the sum of the color of a radial reflection light component and the color of an overall background reflection light component K=(K.r, K.g, K.b), mirror surface index of a material SM, and light source computation in-process flag for the common data Lflagc.

The light source data i (i=1 to 8) includes the following:

light source direction vector L.i=(Lx.i, Ly.i, Lz.i), halfway vector H.i=(Hx.i, Hy.i, Hz.i), (each vector is assumed to be normalized.)

the product of an attenuation coefficient At.i and a spot light source effect Sp.i, AtSp.i, color for background reflection light from a light source Lca.i=(Lca.r.i, Lca.g.i, Lca.b.i), color for diffuse reflection light from a light source Lcd.i=(Lcd.r.i, Lcd.g.i, Lcd.b.i), color for mirror surface reflection light from a light source Lcs.i=(Lcs.r.i, Lcs.g.i, Lcs.b.i), and light source computation in-process flag for light source data i, Lflag.i.

The light source computation unit can be realized in the similar configuration to the one shown in FIG. 1 and thus its explanation will be omitted here.

The color calculation unit determines the colors of vertices I by performing the short int type light source computations on Equation 6 defined below for the light source 1 to m.

[Equation 6]

$$I = K + \left[ \sum_{i=1}^{n} \{Ka \times Lca.i + Kd \times Lcd.i \times (N \cdot L.i) + Ks \times Lcs.i \times (N \cdot H.i)^{\wedge}SM\} \times AtSp.i \right] \quad \text{(Equation 6)}$$

where (N·H.i)^SM is SM power of (N.H.i)

m is the number of light sources, i is a light source (i=1 to m), and

I=(I.r, I.g, I.b, I.a) is the color calculated by the light source computation to execute the calculation of the light sources 1 to m, and the colors I of the vertices are calculated.

(Embodiment 2)

Figure 2:
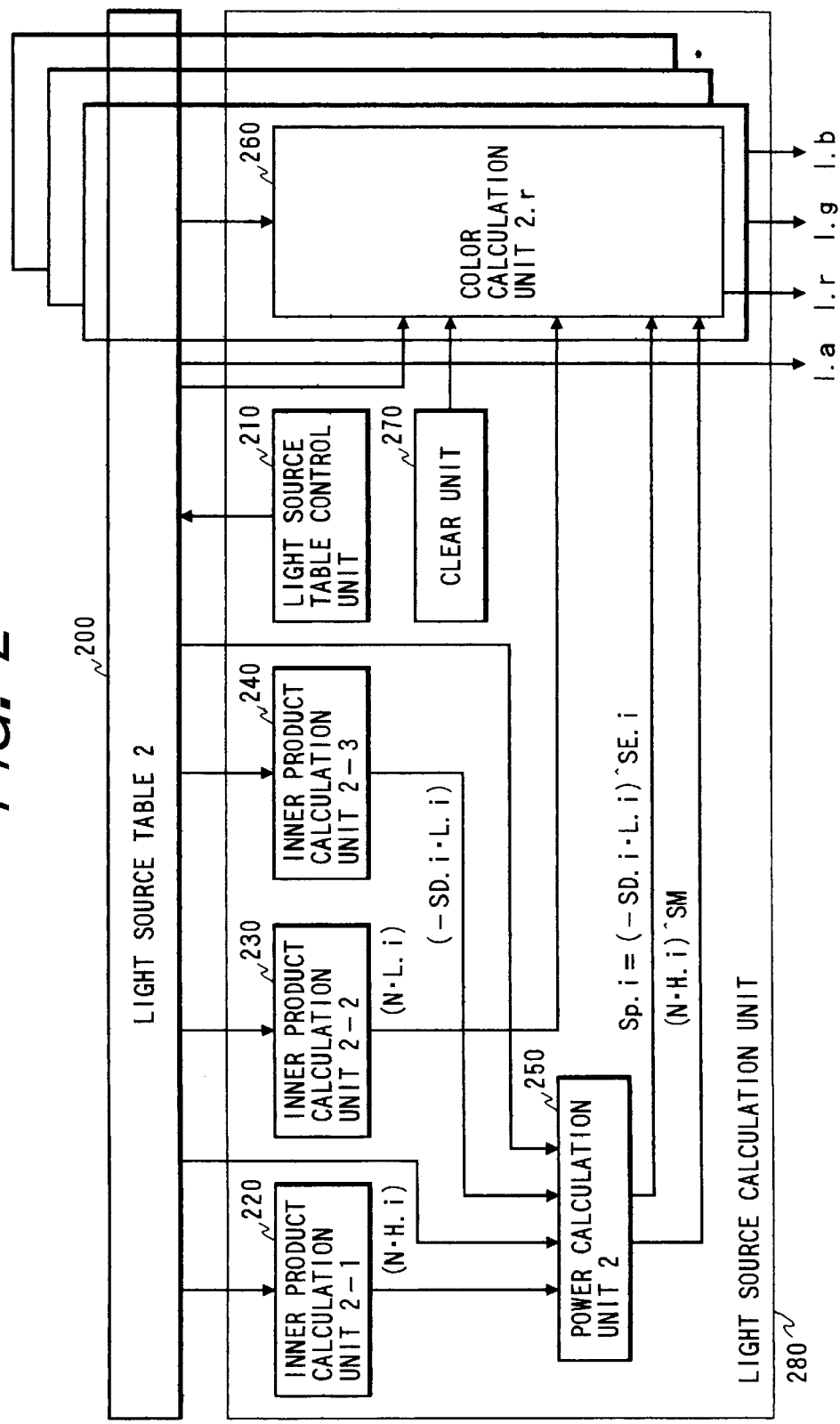
FIG. 2 is a schematic diagram showing another embodiment of the light source computation unit of this invention.

FIG. 2 shows the configuration of the light source computation unit as another embodiment of this invention.

The light source computation unit (280) includes a light source table control unit (210) that locks and unlocks a light source table 2 (200), a register that holds light source data required for the light source computation; a first inner product calculation unit 2-1 (220), a second inner product calculation unit 2—2 (230) and a third inner product calculation unit 2-3 (240), all calculating the inner product of vectors; a power calculation unit (250) to calculate powers; color calculation units (260) (three units for r, g and b) to calculate colors of vertices by performing the light source computation for m light sources, using the results of above calculations and the light source data of the light source table 2 (200); and a clear unit (270) to automatically clear the present colors of intermediate calculation results, after outputting them.

To simplify explanation, let us take an example case where the light source table 2 (200) can hold eight sets of data for the light source 1 to 8, which is of the short int type.

First, the light source table 2 (200) is a register that holds the following values required for the light source computation and the detailed configuration diagram is shown in FIG. 8. These values are set in the light source table 2 (200) by the geometry processor GP that performs coordinate conversion. The values set in the light source table 2 (200) are already converted from the float type to the short int type.

The light source table 2 (200) holds one set of common data that are common for all light sources, such as normal vectors and reflection coefficients of materials, and eight sets of light source data i that are independent for each light source i (i=1 to 8), such as light source direction vectors and colors of reflected light of light source. For the common data and each light source data i, there is a light source computation in-process flag that indicates whether or not the light source computation unit (280) is using these data in the light source computation. The light source table control unit (210) sets the flag to the lock or unlock state. When the light source computation in-process flag is in the lock state, the data cannot be changed; when in the unlock state, the data can be swapped.

The common data includes:
normal vector N=(Nx, Ny, Nz),
transparency a,
background reflection coefficient of a material Ka=(Ka.r, Ka.g, Ka.b),
diffuse reflection coefficient of a material Kd=(Kd.r, Kd.g, Kd.b),
mirror surface reflection coefficient of a material Ks=(Ks.r, Ks.g, Ks.b),
radial reflection coefficient of a material Ke=(Ke.r, Ke.g, Ke.b),
mirror surface index of a material SM,
color for each reflected light from an overall ambient light source Lcta=(Lcta.r, Lcta.g, Lcta.b), and
light source computation in-process flag for the common data Lflagc.

The light source data i (i=1 to 8) includes the following:
light source direction vector L.i=(Lx.i, Ly.i, Lz.i),
halfway vector H.i=(Hx.i, Hy.i, Hz.i),
(each vector is assumed to be normalized.)
attenuation coefficient At.i
spot light source direction vector SD.i=(SDx.i, SDy.i, SDz.i)
spot light source index SE.i,
color for background reflection light from a light source Lca.i=(Lca.r.i, Lca.g.i, Lca.b.i),
color for diffuse reflected light from a light source Lcd.i=(Lcd.r.i, Lcd.g.i, Lcd.b.i),
color for mirror surface reflection light from a light source Lcs.i=(Lcs.r.i, Lcs.g.i, Lcs.b.i), and
light source computation in-process flag for light source data i, Lflag.i.

Next, the light source computation unit (280) will be explained.

The detailed configuration of the light source computation unit (280) is shown in FIG. 2.

The light source computation unit (280) comprises a light source table control unit (210) that controls data-swapping in the light source table; a first inner product calculation unit 2-1 (220) to calculate the inner product (N·H.i) of the normal vector N and the halfway vector H.i, a second inner product calculation unit 2—2 (230) to calculate the inner product (N·L.i) of the normal vector N and the light source direction vector L.i and a third inner product calculation unit 2-3 (240) to calculate the inner product (−SD.i·L.i) of the spot light source direction vector SD.i and the light source direction vector L.i; a power calculation unit (250) to calculate the SM power of the inner product (N·H.i) and the SE.i power of the (−SD.i·L.i); a color calculation unit (260) to determine colors from the light source computation using the above results; and a clear unit (270) to automatically clear the colors, the intermediate results of light source calculation performed for a plurality of light sources, after outputting them.

The light source computation unit (280) is started by a light source computation command and a light source computation & color command from the geometry processor GP to perform the light source computation for each of the light sources 1 to Lnum successively. The command light source number Lnum (1≦Lnum≦8) is encoded in the command. The commands will be described in detail in Embodiment 4. The light source computation unit (280) clamps the intermediate calculated value of color (for example, inner product) and the calculated color in [0.0–1.0] and [0–255], as required.

Next, the individual constitutional elements of the light source computation unit will be explained.

To prevent data of the light source table 2 (200) from being changed during the light source computation, the light source table control unit (210) locks the light source computation in-process flags Lflagc, Lflag.i at the start of the light source computation. Then, the light source computation unit (280) reads the light source data i (i=1 to Lnum) of the light source table 2 (200) one data at a time to perform the light source computation on the light source i successively. Each time the light source computation for one light source is completed, the light source table control unit (210) unlocks the light source computation in-process flag Lflag.i for the light source data i for which the computation has finished. When all the light source computations are finished, the light source table control unit (210) unlocks the light source computation in-process flag for the common data Lflagc. Thus, even during the light source computation, each time the light source computation for one light source is finished, the next, up to eight, light source data can immediately be set one by one in the areas of the light source table 2 (200) where the light source computation has ended. This makes it possible to cope with a large number of light sources even when the number of light source data areas set in the light source table is small, allowing the light source data to be set in the light source table 2 (200) at significantly high speeds.

Next, the clear unit (270) clears the colors which are the intermediate results of light source computations for a plurality of light sources and are held in the color calculation unit (160), after outputting them. Because the light source table 2 (200) can hold only eight sets of light source data at the maximum, when the number of light sources m is greater than 8, as when m=9, the color calculation unit (260) first sets the data for the light source 1 to 8 in the light source data area 1 to 8 in the light source table 2 (200), and holds as the colors of intermediate calculation results those colors that have been calculated by the light source computations performed on the light source 1 to 8 according to the light source computation command requesting only the light source computation and to the command light source number Lnum=8. Next, the color calculation unit (260) sets the data of a light source 9 in the area of the light source data 1 in the light source table 2 (200) (the data of the light source 1 is destroyed) and performs the light source computation on the light source 9 according to the light source computation & color command requesting the light source computation and output of the calculated color and to the command light source number Lnum=1, to add the color of the light source 9 to the colors of intermediate calculation results for the light source 1 to 8 and determine the colors of the light source 1 to 9 (the colors of the present intermediate calculation results). After outputting the colors of the intermediate calculation results, the color calculation unit (260) clears these colors. This enables a large number of light sources to be processed even when there are few light source data areas set in the light source table. This also obviates the need for a clear command used to clear the colors of intermediate calculation results, making it possible to control the light source computation unit at significantly high speeds.

Next, let us explain about the first inner product calculation unit 2-1 (220), the second inner product calculation unit 2—2 (230), the third inner product calculation unit 2-3 (240), the power calculation unit (250) and the color calculation unit (260).

For the sake of simplicity, we will explain about the case where the number of light sources is m=1 to 8.

First, the colors of intermediate calculation results are automatically cleared by the clear unit (270) at the end of the previous light source computation & color command.

Next, the light source computation is performed for each light source i=1 to m as described below.

The first inner product calculation unit 2-1 (220) calculates the inner product (N·H.i) of the normal vector N and the halfway vector H.i; the second inner product calculation unit 2—2 (230) calculates the inner product (N·L.i) of the normal vector N and the light source direction vector L.i; and the third inner product calculation unit 2-3 (240) calculates the inner product (-SD.i·L.i) of the spot light source direction vector SD.i and the light source direction vector L.i.

Then, the power calculation unit (250) calculates the SM power of (N·H.i) and the SE.i power of (-SD.i·L.i) from, for example, $$(N·H.i)^{SM}=e^{(SM \times LOG(N·H.i))}$$

where LOG is a logarithmic operation.

Using the above result, the color calculation unit (260) independently calculates each component of rgb from Equation 7. (The component a is not calculated. I.a=a.)

[Equation 7]

$$I = Ke + Ka \times Lcta + \left[\sum_{i=1}^{n} \{Ka \times Lca.i + Kd \times Lcd.i \times (N·L.i) + Ks \times Lcs.i \times (N·H.i)^{\wedge}SM\} \times At.i \times (-SD.i.L.i)^{\wedge}SE.i\right]$$

where (N·H.i)^SM is the SM power of (N·H.i), (-SD.i·L.i)^SE.i is the SE.i power (-SD.i·L.i), SC.i is a cutoff index of a pot light source, m is the number of light sources, i is a light source (i=1 to m), I=(I.r, I.g, I.b, I.a) is the color calculated by the light source computation, (-SD.i·L.i)^SE.i=1: for parallel light sources and point light sources =(-SD.i·L.i)^SE.i: within the illumination range of a spot light source (-SD.i·L.i)cos(SC.i)

=0: outside the illumination range of a spot light source (-SD.i·L.i)<cos(SC.i)

The color calculation unit determines the colors of vertices I by performing the short int type light source computations on the above Equation 7 for the light source 1 to m.

As described above, because the light source computation unit of this invention can perform most of the light source computation, which has so far been processed by software in the float type calculation that has many hardware quantities and is slow, by hardware in the short int type calculation that has a small amount of hardware and is fast, the light source computation can be done with far fewer hardware quantities than when the float type calculation is used to implement hardware and at significantly higher speeds than the geometry processor GP can perform the light source computation by software.

Further, the light source computation unit of this invention can deal with a large number of light sources even when the light source table has only a small number of light source data areas settable in the light source table, by swapping the light source data with the light source table control unit. Because, even during the light source computation, each time the light source computation for one light source is completed, the next light source data can immediately be set one by one in areas of the light source table where the light source computation has ended, it is possible to set the light source data in the light source table at remarkably high speeds.

Further, because the light source computation unit of this invention has the clear unit automatically clear the temporarily held colors of intermediate result of light source computation, after outputting them; it is possible to cope with a large number of light sources by swapping the light source data even when the light source data areas settable in the light source table are few. This makes unnecessary the clear command for clearing the colors of intermediate results after their output, allowing the light source computation unit to be controlled at significantly high speeds.

As described above, the light source computation unit of this invention can increase significantly the speed of the light source computation in the shading processing of the graphics system.

Figure 3:
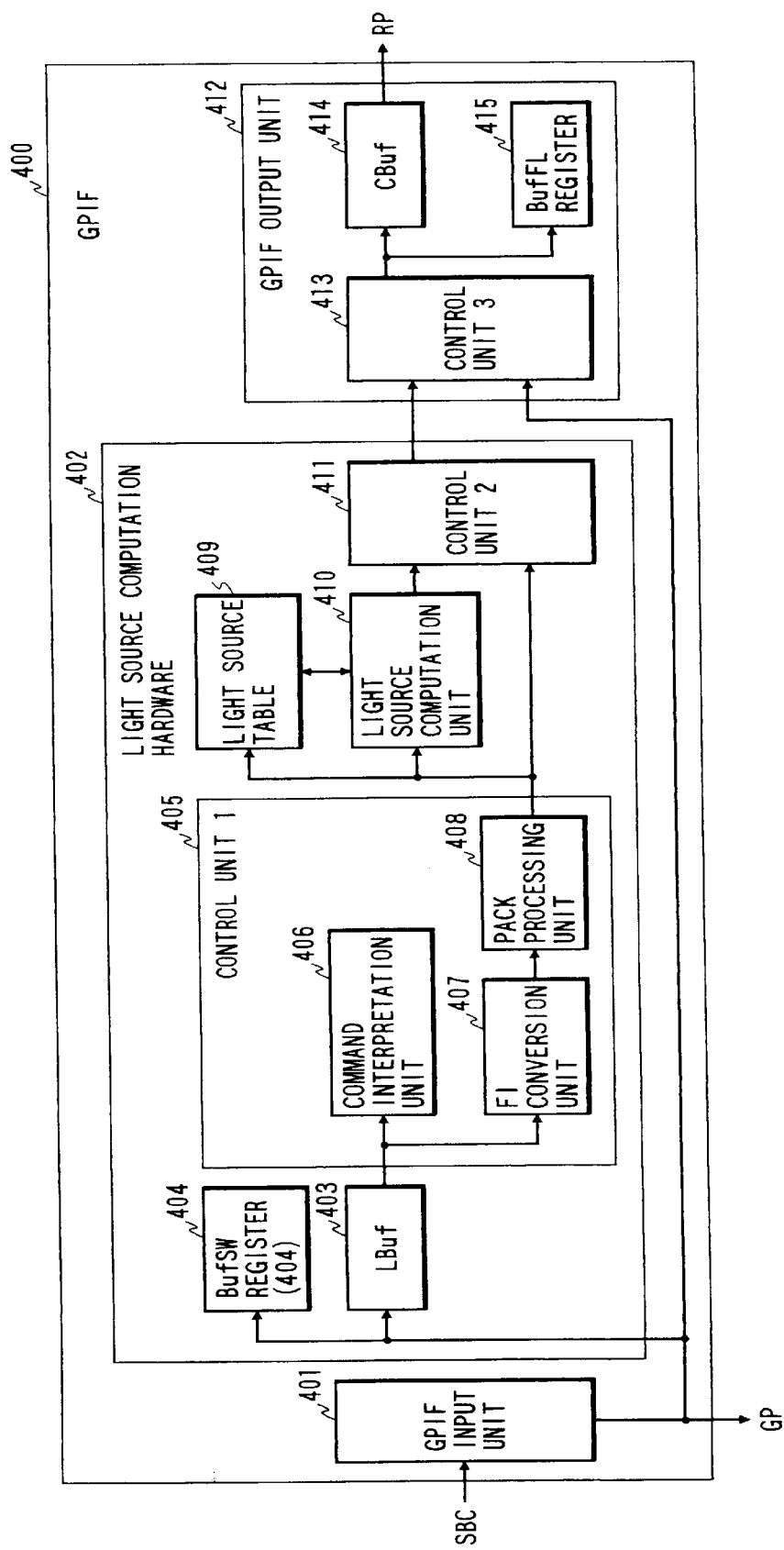
FIG. 3 is a schematic diagram showing an overall configuration of the graphic processor of this invention.

FIG. 3 shows the overall configuration of the graphics process of this invention.

Here, it is assumed that there is a command, which is the first data, followed by a plurality of data of the command.

The graphics processor GPIF (400) of this invention comprises: a GPIF input unit (401), a buffer that holds a command and data sent from a system bus controller SBC which distributes data; an LBuf (403), a buffer that holds a command and data sent to a light source computation hardware (402) from the geometry processor GP that reads the command and data and performs coordinate conversion; a BufSW register (404) to output the command and data from the LBuf (403) to a control unit 1 (405); a command interpretation unit (406) to interpret the command; an FI conversion unit (407) to perform FI conversion on data according to the command, as required; a pack processing unit (408) to pack FI-converted data according to the command, as required; a light source table (409) to hold light source data necessary for the light source computation, detailed in the description of the preceding embodiment; a light source computation unit (410) to perform the light source computation to calculate colors; a control unit 2 (411) to control the sequence of the command and data sent from the control unit 1 (405) and the light source computation unit (410) before sending them to a rendering processor RP that develops a figure into pixels for drawing; a control unit 3 (413) to control the sequence of the command and data sent from the control unit 2 (411) and the geometry processor GP before sending them to the rendering processor RP; a Cbuf (414), a buffer that holds the command and data; and a BufFL register (415) to output the command and data from the Cbuf (414) to the rendering processor RP.

In the following, let the command for the light source computation hardware (402) be LCOM and the command for the rendering processor RP be RPCOM. LCOM can be set for each data to specify whether the data of the command will be FI-converted or not and whether it will be packed or not. (Command will be detailed later.)

First, constitutional elements of the graphics processor will be explained.

(1) GPIF input unit (401) is a buffer to hold the command and data transferred from SBC.

(2) The LBuf (403) is a buffer to, hold the command and data which have been read and coordinate-converted by the geometry processor GP for the light source computation hardware (402). The LBuf (403) is assigned addresses and can be accessed by an address as in the case of memory.

(3) The BufSW register (404) is a register for outputting the command and data held in the LBuf (403) to the control unit 1 (405). When the geometry processor GP sets the number of transfer data n in the BufSW register (404), the LBuf (403) outputs the 4n-byte command and data to the control unit 1 (405) if possible. If not, the LBuf (403) informs the geometry processor GP a message to this effect by outputting an NG and the geometry processor GP waits for another setting to be made in the BufSW register (404).

(4) The control unit 1 (405) comprises a command interpretation unit (406), an FI conversion unit (407), and a pack processing unit (408). The command interpretation unit (406) interprets a command sent from the LBuf (403) and performs according to the instructions of the command; the FI conversion unit (407) performs FI conversion on data, as required; and the pack processing unit (408) performs the pack processing on the FI-converted data, as required. When the command is a light source table setting command requesting a value to be set in the light source table (409), the control unit 1 (405) sets the data if the light source computation in-process flag of the light source table (409) is in the unlock state. If the setting cannot be made (the flag is in the lock state), the control unit 1 (405) stands by. When the command is a light source computation command requesting only the light source computation or a light source computation & color command requesting the light source computation and output of colors, the control unit 1 (405) outputs the data to the light source computation unit (410) if possible. If not, the control unit 1 (405) stands by. When the command and data are other than the above, the control unit 1 (405) outputs the command and data to the control unit 2 (411) if possible. If not, the control unit 1 (405) stands by.

(5) The light source table (409) holds eight light source data and, when the number of light sources is nine or more, the geometry processor GP swaps the light source data, as explained in the description of the previous embodiment.

(6) The light source computation unit (410) performs the light source computation according to the light source computation command and to the light source computation & color command to calculate colors.

Upon receiving a light source computation command from the control unit 1 (405), the light source computation unit (410) performs the light source computation for only the command number Lnum of light sources, adds the calculated color to the colors of previous intermediate results and holds them as the colors of the current intermediate results.

The light source computation unit (410), when it receives a light source computation & color command from the control unit 1 (405), performs the light source computation for the command number Lnum of light sources, adds the calculated color to the colors of previous intermediate result, outputs the sum colors to the control unit 2 (411) if possible, and automatically clears the colors of the intermediate results it is holding. When the colors cannot be output, the light source computation unit (410) waits.

(7) When it uses and does not use the light source computation unit (410), the control unit 2 (411) controls, according to the sequence of the command and data set in the LBuf (403), the sequence of the command and data for the rendering processor RP sent from the light source computation unit (410) and the control unit 1 (405). Then, the control unit 2 (411) outputs the command and data to the control unit 3 (413) if possible. If not, the control unit 2 (411) waits.

(8) The control unit 3 (413) controls the sequence of the command and data sent from the control unit 2 (411) and sent to the rendering processor RP and then outputs the command and data to the Cbuf (414) or the BufFL register (415) if possible. If not, the control unit 3 (413) waits. When the light source computation hardware (402) is in use, an access made by the geometry processor GP to the control unit 3 (413) is not effected until the use of the light source computation hardware (402) is ended. Similarly, when the geometry processor GP is making an access to the control unit 3 (413), an access from the light source computation hardware (402) to the control unit 3 (413) is kept in a waiting state.

(9) The Cbuf (414) is a buffer to hold the command and data to be output to the rendering processor RP. The Cbuf (414) is assigned addresses and can be accessed through addresses as in memory. When the light source computation hardware (402) is used, the Cbuf (414) is set by the light source computation hardware (402) using a CBuf setting command. When the light source computation hardware (402) is not used, the Cbuf (414) is directly set by the geometry processor GP. This through-mode allows the geometry processor GP to access the Cbuf (414) directly at high speed even when the light source computation hardware (402) is not used.

Outputting the command and data held in the Cbuf (414) to the rendering processor RP can be done through the following two methods. When the light source computation hardware (402) is used, the number of transfer data is set in the BufFL register (415) by an output start command. When the light source computation hardware (402) is not used, the geometry processor GP directly sets the number of transfer data in the BufFL register (415).

(10) The BufFL register (415) is a register to output the command and data held in the Cbuf (414) to the rendering processor RP. When the number of transfer data n is set in the BufFL register (415), the Cbuf (414) outputs the 16n-byte command and data to the rendering processor RP if possible. If the command and data cannot be output, the BufFL register (415) issues an NG to the control unit 3 (413), which in turn waits for the setting to the BufFL register (415).

Next, the commands LCOM for the light source computation hardware (402) will be explained.

First, the kinds of commands will be explained in the following.

A light source table setting command specifies a command and an address of the light source table (409) to set the data in the light source table (409).

A light source computation command specifies a command and a command number-of-light-sources Lnum to perform only the light source computation by the light source computation unit (410) and hold the calculated color.

A light source computation & color command specifies a command and a command number-of-light-sources Lnum to perform the light source computation by the light source computation unit (410) and set the calculated color in the Cbuf (414).

A CBuf setting command specifies a command and an address of the Cbuf (414) to set the data in the Cbuf (414).

An output start command specifies a command and the number of transfer data to output the data held in the Cbuf (414) to the rendering processor RP.

Each of these commands can specify the following two kinds of mode to the data set in the data setting destination (light source table (409) or Cbuf (414)).

(1) An FI conversion specifies whether or not to FI-convert the command data by the number of data for each data.

(2) A pack specifies whether or not to pack the command data by the number of data for each data after (1).

Next, the command format will be explained.

Figure 5:
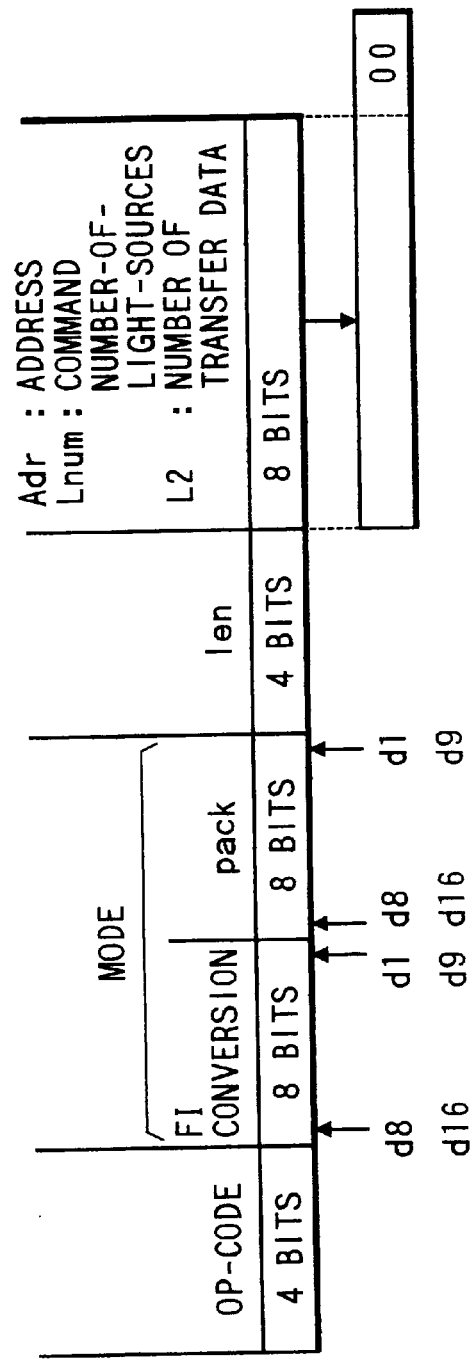
FIG. 5 is an example of the command format used by the processor of this invention.
Figure 6:
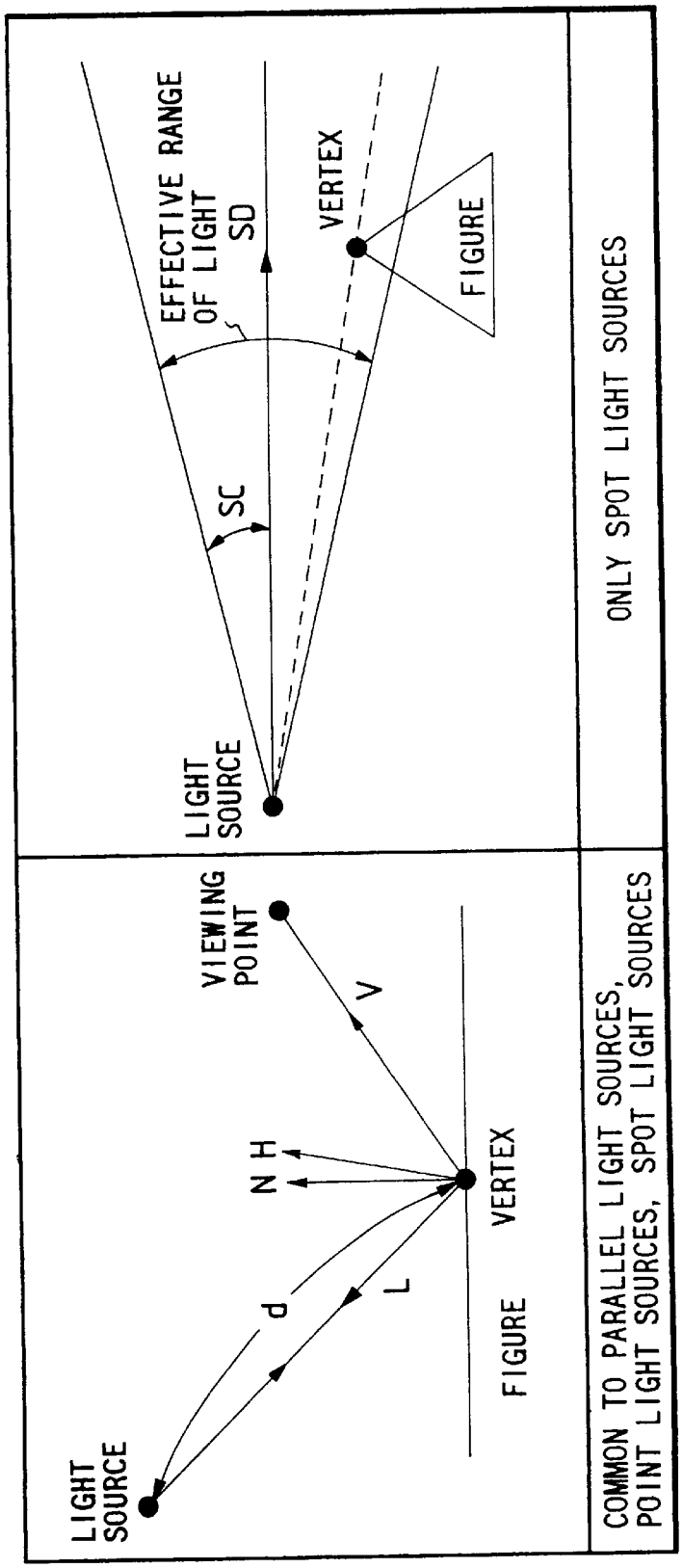
FIG. 6 is a diagram showing the relation between the light source and the vectors.

FIG. 5 shows an example command format used in the processor of this invention.

Commands are 32-bit long, and their op-code is 4-bit long and specifies the kind of the command.

There are two modes. The FI conversion is 8-bit long and specifies for each data whether or not to perform the FI conversion. The pack is 8-bit long and specifies for each data whether or not to perform packing.

The len is 4-bit long and specifies the number of data of argument of the command.

Finally, the address Adr, the number of transfer data L2 and the command number-of-light-sources Lnum are 8-bit long and their meanings differ depending on the kind of command as follows. The Adr represents the address of the light source table (409) when the command is a light source table setting command. When the command is a CBuf setting command, the Adr represents the address of the Cbuf (414) and has a total of 10 bits with lower two bits 0-expanded.

The Lnum is a command number-of-light sources that are to be subject to the light source computation when the command is a light source computation command or a light source computation & color command.

The L2 represents the number of transfer data to be set in the BufFL register when the command is an output start command. The amount of data to be transferred is $16pL2$ bytes.

Next, we will explain about the modes.

When the len is 8 or smaller, the operation is stopped halfway according to the number of data of len. When the len is greater than 8, the operation is repeated from d1 to d8.

The FI conversion does not FI-convert the data dn of the command when the bit of dn is 0 and, when the bit of dn=1, FI-converts the data dn of the command.

The pack operates as follows.

When the dn bit is 0, the data dn (4 bytes) of the FI-converted command are packed and the data dn (4 bytes) are set in four bytes of the area where data are set (light source table (409) or Cbuf (414)). It is noted, however, that if the previous data dn−1 is already set in the lower two bytes of the location where data are set, the data dn is set in the next four bytes.

When the dn bit is 1, the FI-converted data dn (4 bytes) (of the 4 bytes, the lower two bytes are valid) are packed and the data dn (2 bytes) are set in the lower two bytes of the location where data are set (light source table (409) or Cbuf (414)). If, however, the previous data dn−1 is already set in the lower two bytes of the location where data are set, the data dn is set in the higher two bytes. Although this embodiment first set the lower two bytes of the four, the higher two bytes may be set first.

FIG. 11 shows one example of operation of the FI conversion and packing performed by the processor of this invention. LCOM is a command for the light source computation hardware and d1–d6 are data of the command.

Data d1–d3 are of int type and data d4–d6 are of float type.

The pnumberp means a binary number and "?" means that the number may be either 0 or 1.

When the bits of d8–d1 of the FI conversion in LCOM are "??111000" and the bits of d8–d1 of the pack are "??001110", the operation will be as follows.

First, as for the FI conversion, because the d1, d2 and d3 bits of FI conversion are "0", the data d1, d2 and d3 are not FI-converted. Because d4, d5 and d6 bits are "1", the data d4, d5 and d6 are FI-converted. Here, the FI-converted data d4 is represented by (int)d4 and other data are represented similarly.

Next, as for packing, because the d1, d5 and d6 bits of the pack are p0p, the data d1, d5 and d6 are not packed. Because the d2, d3 and d4 bits are "1", the data d2, d3 and d4 are packed. The data before being packed is 4-byte long, while the data after packing is 2-byte long.

Next, the operation of each command will be explained.

(1) Light Source Table Setting Command

The light source table setting command performs FI conversion and packing of the data of the command according to the mode and sets the processed data in the locations in the light source table (409) specified by the address Adr.

(2) Light Source Computation Command

The light source computation command has no data of its own, refers to the light source table (409) for the specified number of light sources Lnum encoded in the command, performs only the light source computation by the light source computation unit (410) to calculate a color, adds the calculated color to the colors of previous intermediate result, and holds them as the colors of the current intermediate results.

(3) Light Source Computation & Color Command

The light source computation & color command has no data of its own, refers to the light source table (409) for the specified number of light sources Lnum encoded in the command, performs the light source computation by the light source computation unit (410) to calculate a color, adds the calculated color to the colors of previous intermediate results to produce the colors of current intermediate results, sets them in the Cbuf (414), and automatically clears the colors of the current intermediate results it is holding.

(4) CBuf Setting Command

The CBuf setting command performs the FI conversion and packing of the data of the command according to the mode and sets the processed data in the Cbuf (414).

(5) Output Start Command

The output start command has no data of its own, and sets the transfer data number (L2) encoded in the command into the BufFL register and then outputs the data (16×L2 bytes) of CBuf (414) to the rendering processor RP.

Next, the use of commands and the overall operation will be explained.

FIG. 10 shows an example of use of the command in the processor of this invention.

For simplicity, we take an example where the number of light sources m is nine. It is assumed that the geometry processor GP has already finished the geometric processing and calculated the vertex coordinates (x, y, z), normal vector (Nx, Ny, Nz), and texture data (s, t, w, rate).

(Step 1) To set the common data and the light source data 1-8 in the light source table (409), the geometry processor GP sets in the LBuf (403) the light source table setting command LCOM (LtblW), common data and light source data 1-8 and also sets the number of transfer data in the BufSW register (404). If the number of transfer data cannot be set in the BufSW register (404), the BufSW register (404) issues an NG to the geometry processor GP, which then waits.

The graphics processor GPIF (400), if the number of transfer data are set in the BufSW register (404), reads the specified number of transfer data from the LBuf (403) and processes them. GPIF (400) reads the LCOM (LtblW), common data and light source data 1-8, performs FI conversion and packing of the data according to the LCOM (LtblW) and sets the processed data in the light source table (409). If the data cannot be set in the light source table (409), GPIF (400) waits.

(Step 2) To set in the Cbuf (414) the triangle strip draw command RPCOM (Strip) and vertex coordinates (x, y, z) for the rendering processor RP, the geometry processor GP sets the CBuf setting command LCOM (CBufW), RPCOM (Strip) and vertex coordinates (x, y, z) in the LBuf (403). Next, to set the normal vector (Nx, Ny, Nz) in the light source table (409), the GP sets the LCOM (LtblW) and normal vector (Nx, Ny, Nz) in the Lbuf (403). Then, to perform the light source computation of the light source data 1-8, the GP sets the light source computation command LCOM (Lcalc) in the LBuf (403) and also sets the number of transfer data in the BufSW register (404). If the number of transfer data cannot be set in the BufSW register (404), the BufSW register (404) issues an NG to the GP, which then waits.

The graphics processor GPIF (400) first reads the LCOM (CBufW), RPCOM (Strip) and vertex coordinates (x, y, z), performs FI conversion and packing of the data according to the LCOM (CBufW) as required and sets the processed data in the CBuf (414). If the data cannot be set in the CBuf (414), the GPIF (400) waits. Next, the GPIF reads the LCOM (LtblW) and normal vectors (Nx, Ny, Nz), performs FI conversion and packing of the data according to the LCOM (LtblW) as required and sets the processed data in the light source table (409). If the data cannot be set in the light source table (409), the GPIF (400) waits. Then, the GPIF reads the LCOM (Lcalc), performs only the light source computation of the light source data 1-8 using the values of the light source table (409) according to the LCOM (Lcalc), and holds the calculated colors as the colors of intermediate calculation results. The light source computation unit (410) performs the light source computation at very high speed as described in the previous embodiment.

(Step 3) To set the light source data 9 in the light source table (409), the geometry processor GP sets the LCOM (LtblW) and light source data 9 in the LBuf (403) and also sets the number of transfer data in the BufSW register (404). (The light source data 9 is written over the light source data 1. The light source data 1 are destroyed.) If the transfer data number cannot be set in the BufSW register (404), the BufSW register (404) issues an NG to the GP, which then waits.

The GPIF (400) reads the LCOM (LtblW) and light source data 9, performs the FI conversion and packing of the data according to the LCOM (LtblW) as required, and sets the processed data in the light source table (409). If the data cannot be set in the light source table (409), the GPIF (400) waits.

(Step 4) To perform the light source computation of the light source data 9 and output the calculated color, the geometry processor GP sets the light source computation & color command (LCOM (LcalcC)) for the light source data 9 in the LBuf (403). Next, to set the texture data (s, t, w, rate) in the CBuf (414), the GP sets the LCOM (CBufW) and texture data (s, t, w, rate) in the LBuf (403). Then, to output the data held in the CBuf (414) to the rendering processor RP, the GP sets the output start command LCOM (Exec) in the LBuf (403) and also sets the number of transfer data in the BufSW register (404). If the number of transfer data cannot be set in the BufSW register (404), BufSW register (404) issues an NG to the GP, which then waits.

The GPIF (400) reads the LCOM (LcalcC), performs the light source computation of the light source data 9, adds the calculated color to the colors of intermediate result of (Step 2) to obtain the colors (I.r, I.g, I.b, I.a), and sets the colors in the CBuf (414). If the data cannot be set in the CBuf (414), the GPIF (400) waits. Next, the GPIF (400) reads the LCOM (CBufW) and the texture data (s, t, w, rate), performs FI conversion and packing of the data according to LCOM (CBufW) as required, and sets the processed data in the CBuf (414). If the data cannot be set in the CBuf (414), the GPIF (400) waits. Then, the GPIF (400) reads the LCOM (Exec), sets the number of transfer data L2 in the BufFL register (415) and, if possible, outputs the data (16×L2 bytes) of the CBuf (414) to the rendering processor RP. If the RP cannot receive the data, the RP issues an NG to the GPIF (400), which then waits.

As described above, the processor of this invention suited for the graphics system converts float type data necessary for the light source computation into data of int type by the FI conversion unit, converts the data of int type into data of short int type by the pack processing unit, holds the converted result in the light source table described in the above embodiment, and performs the light source computation using the data of the short int type by the light source computation unit to calculate the colors of vertices. Thus the light source computation can be carried out at significantly high speed.

In the processor of this invention, the control unit 3 that controls the sequence of the data sent from the light source computation hardware and the GP and the through-mode of the control unit 3 enable the GP to output data to the RP at significantly high speed even when the light source computation hardware is not used.

Various commands to control the processor of this invention and the control method using these commands make it possible to control the processor at significantly high speeds.

As explained above, the processor of this invention suited for the graphics system can increase the light source computation remarkably.

The figure drawing processing time can therefore be shortened dramatically.

Figure 4:
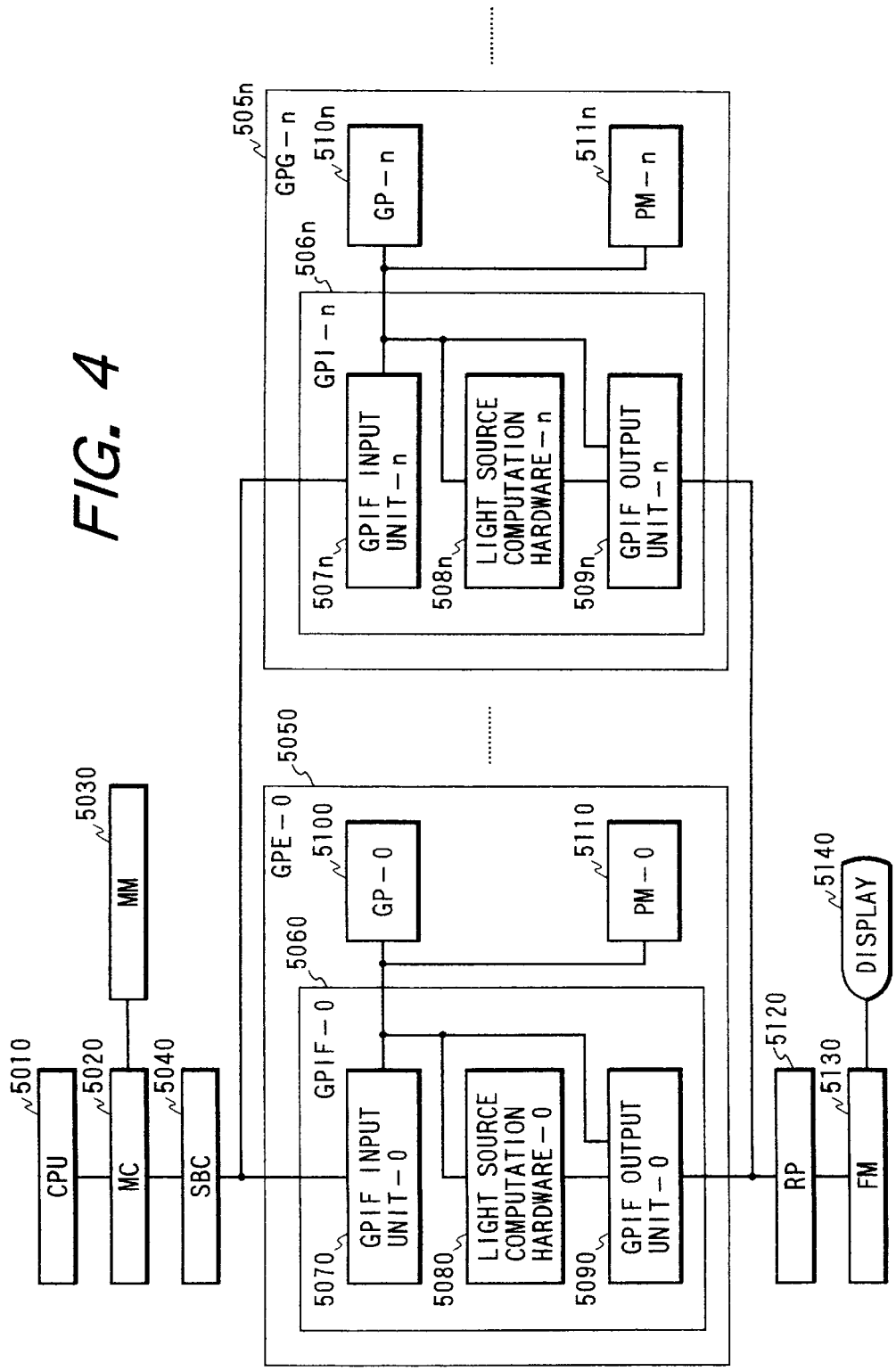
FIG. 4 is a schematic diagram showing an overall configuration of a system using the graphic processor of FIG. 3.

FIG. 4 shows an overall configuration of the graphics system of this invention.

The graphics system of this invention comprises: a CPU (5010) to execute an application soft; a main controller MC (5020) to control the main memory MM (5030); a system bus controller SBC (5040) to distribute data to geometry processor elements GPE-0 to GPE-n (5050–505n); geometry processors GP-0 to GP-n (5100–510n) to perform geometric processing such as coordinate conversion; private memories PM-0 to PM-n (5110–511n) dedicated to the geometry processors GP-0 to GP-n (5100–510n); processors GPIF-0 to GPIF-n (5060–506n) to control the input and output of GP-0 to GP-n (5100–510n) and PM-0 to PM-n (5110-511n); a rendering processor RP (5120) to develop a figure into pixels for drawing; a frame memory FM (5130) to hold the drawn image; and a display (5140) to show the image.

The GPIF-0 to GPIF-n (5060–506n), as explained referring to FIG. 3, comprises: GPIF input unit-0 to -n (5070–507n) to hold data sent from the SBC (5040); light source computation hardware-0 to -n (5080–508n) to perform light source computation; and GPIF output unit-0 to -n (5090–509n) to hold data to be output to the RP (5120).

As shown in FIG. 4, the geometry processor elements GPE-0 to GPE-n (5050–505n) may comprise n parallelly connected elements or a single element.

Next, the overall operation will be explained.

The CPU (5010) executes an application soft, issues graphics commands (drawing commands) for GP-0 to GP-n (5100–510n) and data such as vertex coordinates of a figure to be drawn, normal vectors, texture data, reflection coefficients of materials and colors for reflection light from light sources, and outputs them through the MC (5020) to the SBC (5040).

The SBC (5040) distributes the command and data sent from the CPU (5010) to the GPE-0 to GPE-n (5050–505n).

The processors GPIF-0 to GPIF-n (5060–506n) stores the command and data sent from the SBC (5040) into the GPIF input unit-0 to -n (5070–507n)

The GP-0 to GP-n (5100–510n) reads the command and data held in the GPIF input unit-0 to -n (5070–507n), performs geometric processing such as coordinate conversion according to the command and data to calculate the vertex coordinates, normal vectors and texture data, and sets the command and data in the light source computation hardware-0 to -n (5080–508n).

The light source computation hardware-0 to -n (5080–508n), as described above, performs the light source computation according to the command and data to calculate the colors of vertices, and outputs to the GPIF output unit-0 to -n (5090–509n) the triangle strip drawing command, vertex coordinates, colors and texture data, all for the RP (5120).

The GPIF output unit-0 to -n (5090–509n) outputs the vertex coordinates, colors and texture data to the RP (5120).

The rendering processor RP (5120) performs the rendering processing, which, according to the command and data, develops drawing pixels inside a figure one pixel at a time through interpolation, and writes the figure data into the FM (5130) where the figure data is held in a bit map format to display the figure on the display (5140).

As detailed above, in the graphics system of this invention, the use of the graphics processor explained referring to FIG. 3 has resulted in a significant increase of the speed of the light source computation in the shading processing of the graphics system.

With this graphics processor, the drawing processing time can be shortened remarkably.

The light source computation means of this invention, the graphics processor having the light source computation means and suited for a graphics system, and the graphics system to which this graphics processor is applied to substantially increase the speed of the light source computation in the shading processing in the graphics system. The increased speed of the light source computation in turn provides unique advantages of a significant reduction in the figure drawing processing time and improved system operability.

What is claimed:

1. A graphic processor, which performs light source calculations, comprising:

a light source table which holds the predetermined m(m>1) light source data decided in advance and has information which indicates whether said light source data is used by the light source calculation for calculating the color of each vertices of the three-dimensional figure.

2. A graphic processor according to claim 1, wherein an increase in a rate of light source calculation times from one light source to m light sources is smaller than the increase in a rate of light source calculation times from m light sources to m+1 light sources.

3. A graphic process according to claim 2, and further including control means to rewrite said light source data stored in said light source table if a number of light sources which is actually calculated is more than a number of light sources stored in said light source table.

* * * * *